(No Model.) 2 Sheets—Sheet 1.
G. D. LAMM.
HAY RAKE.
No. 520,320. Patented May 22, 1894.
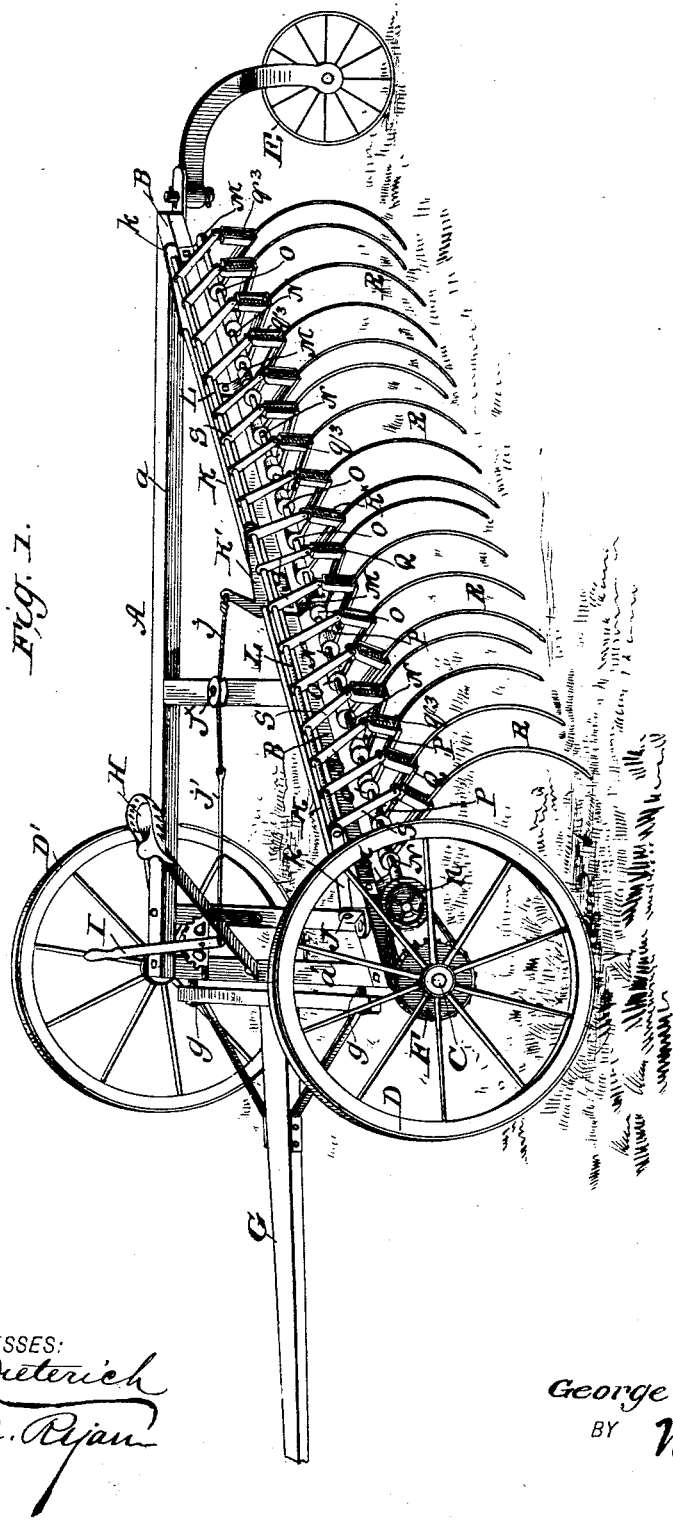
WITNESSES:
Fred J. Dieterich
Jos. A. Ryan
INVENTOR
George D. Lamm
BY
Munn & Co.
ATTORNEYS.

(No Model.) 2 Sheets—Sheet 2.
G. D. LAMM.
HAY RAKE.
No. 520,320. Patented May 22, 1894.
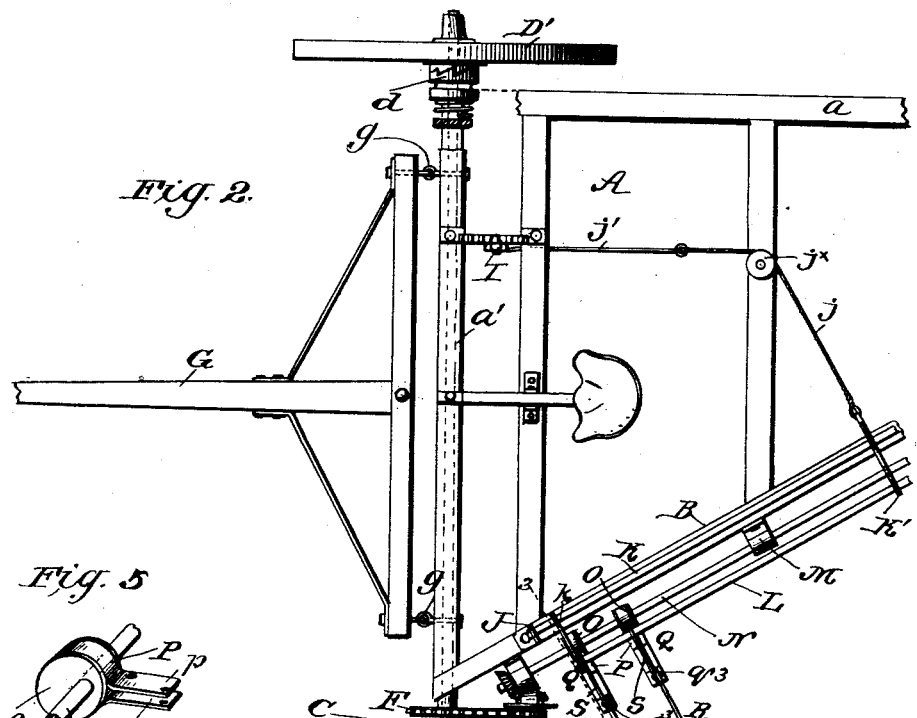
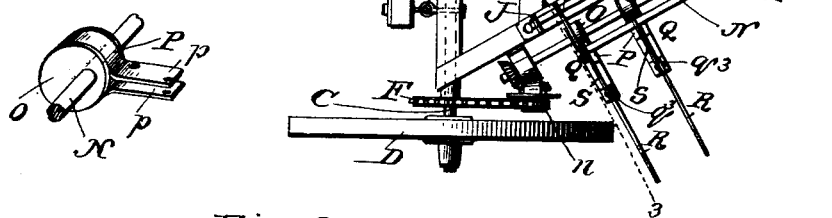
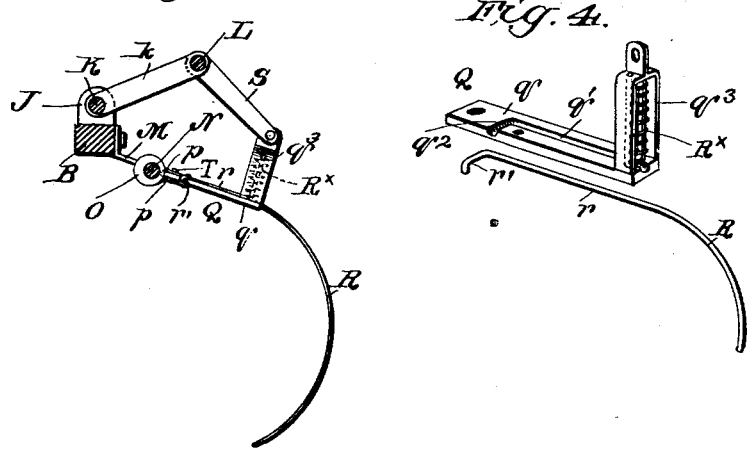
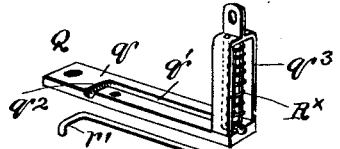
WITNESSES:
Fred G. Dieterich
Jos. A. Ryan
INVENTOR
George D. Lamm
BY Munn & Co
ATTORNEYS.

UNITED STATES PATENT OFFICE.

GEORGE D. LAMM, OF ACKLEY, IOWA.

HAY-RAKE.

SPECIFICATION forming part of Letters Patent No. 520,320, dated May 22, 1894.

Application filed January 12, 1894. Serial No. 496,601. (No model.)

*To all whom it may concern:*

Be it known that I, GEORGE D. LAMM, residing at Ackley, in the county of Hardin and State of Iowa, have invented a new and Improved Hay-Rake, of which the following is a specification.

My invention is in the nature of a side delivery rake, and among other objects it has for its purpose to provide a machine of this kind, which will leave the hay in a continuous windrow, require no dumping, and will leave the windrow much straighter than has heretofore been done.

It has also for its purpose, to provide a machine, in which the rake teeth, will, as they are drawn along, have an intermittent picking movement, to the more effectively separate the hay and avoid packing it and thereby allow it to cure more evenly and quicker.

With other objects in view and which hereinafter will be referred to, the invention consists in such novel features of construction and peculiar combination of parts, as will be first described in detail and then be pointed out in the claims, reference being had to the accompanying drawings, in which—

Figure 1 is a perspective view of my improved hay rake. Fig. 2 is a plan view, partly in section, of the front end of the machine. Fig. 3 is a transverse section taken on the line 3—3 Fig. 2. Fig. 4 is a detail perspective view of one of the spring supporting castings or plates hereinafter referred to, and Fig. 5 is a detail view of one of the eccentrics and a portion of the eccentric shaft.

In the accompanying drawings, A indicates the main frame, formed of an inner longitudinally extending member $a$, the front cross bar $a'$ and the diagonally arranged rake frame supporting beam B, such frame being mounted at the front end on the axle C, on which are mounted the drive wheels D, D' and at the rear end, it is mounted on a caster wheel support E as shown. The wheel D' is loosely mounted on the axle, and has a spring actuated clutch connection $d$, with such axle, which in practice can be operated and set in or out of operative engagement by any suitable lever mechanism. At the end adjacent the wheel D, the shaft has a sprocket wheel F, which is adapted to impart motion to the rake devices as will presently appear.

G indicates the tongue, which is connected to the front beam $a'$, by the swivel bolts $g\ g$, as shown in Fig. 2.

H indicates the driver's seat, I the rake lifting lever disposed adjacent the driver's seat and which has the usual detent devices as shown.

Bracket bearings J, are secured upon the diagonal beam B, in which is journaled a rock shaft K, from which project rearward crank arms $k$ in which is held a rod L, which forms an upper support for the rake teeth, such shaft being also provided with a crank arm K', with which is connected, by the cable and rod $j\ j'$, the operating lever I, the cable passing over a guide pulley $j^\times$ as clearly shown in Fig. 1. Angle brackets M M, are projected from the rear face of beam B, in which is journaled a rotary shaft N, provided at one end with a sprocket wheel $n$, which is geared with and driven by the sprocket wheel F, before referred to. Upon the shaft N is fixedly held a series of eccentric disks O, around which pass straps P, the ends of which connect with castings Q to which are connected the rake teeth R.

By referring now more particularly to Fig. 4, it will be noticed that the castings Q are each formed of a horizontal member $q$ formed with a longitudinal groove $q'$, terminating near the inner end of such member in a lateral portion $q^2$, and at the outer end the member $q$ terminates in a vertical slotted guide $q^3$, in which is held a coiled spring R. Each of the guides is supported from the rod L by pendent link arms S, hung on such rod, the lower ends of which are pivotally connected with the guides $q^3$ as shown. The rake teeth R have upper straight portions $r$ which are adapted to seat in the grooves $q'$, and lateral hook portions $r'$ which seat in the portions $q^2$ of the said grooves, and such portions $r$ of the teeth pass through the guides under the coil springs, and are held securely on the castings Q, by the ends $p$ of the straps P, which are looped over them and secured by the bolts T as clearly shown in Fig. 3.

The eccentric disks K, are in practice projected radially in different planes, whereby the teeth are lifted intermittently. In the practical construction I prefer to arrange the several disks, so that when the first tooth is up to its highest position, the fourth tooth is down to take up the hay.

From the foregoing description, taken in connection with the drawings, it will be seen, that, all the rake teeth can be raised at one time by the lever H, and each tooth is capable of independent movement, and owing to their peculiar connection with the castings Q, and the back pressure springs the same will automatically lift when passing over obstructions. Furthermore by connecting them with the eccentric shaft in the manner shown, a continuous intermittent movement will be imparted to the teeth as the machine is drawn along, thereby thoroughly turning over and spreading the hay at the same time that it is being raked into a windrow.

Having thus described my invention, what I claim, and desire to secure by Letters Patent, is—

1. A hay rake comprising a main frame, having a rake beam, and a shaft mounted longitudinally on such beam having a series of rearwardly projecting crank arms, joined by a longitudinal rod, a series of independent pendent frames pivotally supported at their rear on such rod, a rotary shaft journaled on the rake beam, connected with and operated by one of the drive wheels, having a series of eccentrics, adapted to engage the front end of the pendent frames, and impart an oscillatory movement thereto, and rake teeth secured on such pendent frames, all arranged substantially as shown and for the purposes described.

2. As an improvement in hay rakes the combination with the main frame, and the rake head, having a longitudinally disposed supporting rod provided with a series of pendent pivoted arms, supporting boxes or members, having each a rake tooth connected therewith pivotally connected at their upper end on the pendent arms, a rotary shaft having a series of eccentrics, for each tooth holding member, operated from the drive wheels, and a loop connection between the front end of the tooth holding member and the eccentric, arranged substantially as shown, whereby such member will be oscillated vertically as the eccentrics rotate as set forth.

3. An improved side delivery hay rake, comprising the main frame, including a diagonally disposed rear beam, drive wheels at the front and a caster wheel support at the rear of such frame, a rotary shaft having a series of eccentrics journaled on the rear of the rear beam, having gear connections with one of the drive wheels, a rock shaft journaled on such rear beam, having upwardly and rearwardly projected crank arms, a lever mechanism connected with one of such arms, a supporting rod held on the others, a series of pendent link arms secured to such rod, each having a tooth bearing plate secured thereto, carrying the rake teeth, and bands passed about the eccentrics and secured at their ends to the front ends of such plates, all arranged substantially as shown and for the purposes set forth.

GEORGE D. LAMM.

Witnesses:
WILLIAM SICARD,
JOHN SICARD.